(No Model.)

C. H. DENISON.
BASIN AND SINK TRAP.

No. 253,852. Patented Feb. 21, 1882.

Witnesses.
Alex. Scott
Jas. W. Graham.

Inventor.
C. H. Denison.
By his Atty
Harry King.

United States Patent Office.

CHARLES H. DENISON, OF NEW YORK, N. Y.

BASIN AND SINK TRAP.

SPECIFICATION forming part of Letters Patent No. 253,852, dated February 21, 1882.

Application filed June 3, 1881. (No model.)

*To all whom it may concern:*

Be it known that I, CHARLES H. DENISON, a citizen of the United States, residing at New York, in the county of New York and State of New York, have invented certain new and useful Improvements in Basin and Sink Traps; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to basin and sink traps; and it consists in so constructing the same as to prevent the escape of water therefrom by siphonage, and consequent influx of sewer-gases through the pipes into the room, as will be hereinafter more fully set forth.

Figure 2:
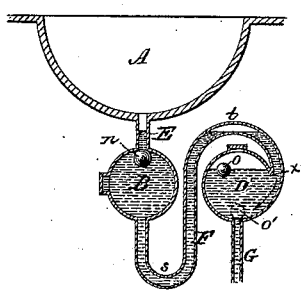
Figure 3:
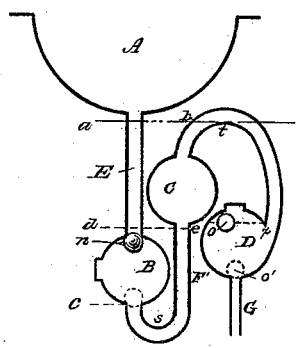
Figure 1:
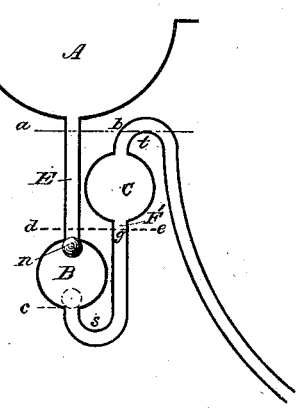
Figure 4:
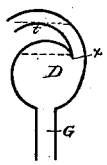

In the drawings, Figure 1 is a vertical longitudinal section of one form of my improved trap. Fig. 2 is a similar view of a modified form of the same. Fig. 3 is a similar view of another modified form, and Fig. 4 is a similar view of air-bulb.

A simple or unimproved trap is formed by bending or depressing a section of the pipe to an extent equal to or greater than the diameter of the pipe.

In Fig. 1, in which A is the wash-basin and E and F the eduction-pipe, all that portion of the pipe below the line $a\ b$ is a trap, and but for the bulbs therein shown would be a simple trap. From the point $a$ to the point $s$ is the first arm, and from the point $s$ to the point $b$ is the second arm, of the trap. For improvement, in the first place I insert into the first arm of the trap, as a section thereof, the bulb B, with a floating or buoyant bulb-valve, $n$, contained therein. This valve is for the purpose, in part, of closing the mouth of pipe E, being held up to that point by the water, and so preventing the escape of gases into the room. I am aware that a device substantially the same as this has heretofore been patented for the purpose last above named, and would be effectual if sufficient water always remained in the trap to hold the valve securely on its seat at the top of B; but as hitherto no adequate provision has been made against siphonage the water is frequently drawn out of the trap, so as to render the valve inoperative. To prevent this siphonage and render said valve constantly operative, my first method or improvement is to provide a supplemental reservoir by the extension of the second arm of the trap above the level of the top of bulb B into a capacity somewhat greater than that of B by any convenient method, but best as represented by the bulb C. By this means I secure the novel and greatly useful improvement of the valve being brought to operate at both ends of bulb B alternately. Now, if siphoning takes place, the water may be drawn from the point $a$ down to the point $c$, when the valve will close the lower opening of B and preclude any further siphoning. The water now stands from $c$ to $b$ till the suction ceases, when it will fall back from $b$ and rise from $c$, and as C is greater than B, B will be instantly filled and the valve restored to its upper seat, as the normal level of the water now would be at about the line $d\ e$.

Another form of my non-siphoning improvement is the following device, to be used in combination with bulb B, with, as in Fig. 3, or without the reservoir C, as in Fig. 2.

I insert a bulb, as represented by D in Fig. 2, into the waste-pipe beyond the lower bend, $t$, of the trap, also furnished with a floating ball-valve, $o$. The best way to construct this and the reasons therefor are as follows: As the bulb D stands empty except during intervals of flowage, the normal position of valve $o$ is at $o'$, and in case basin A is out of use for a while the valve, by becoming dry, tends to adhere to its seat at the mouth of pipe G. To insure its displacement at the moment flowage begins pipe F is carried over and joined at the side of bulb D, by which arrangement the stream entering said bulb is directed against the side of the valve and lifts it out of position. Again, pipe G is a trifle smaller than pipes E and F. This arrangement necessitates a gradual accumulation of water in D, by which certain important advantages are secured. First, the valve is kept lifted up during flowage, and so prevented from contending against the escape of the water at the mouth of G. In the next place, as the water rises in D the air is condensed above it. This condensed air, constantly reacting in all directions, serves to equalize the flow into and out of D and insure the breaking of the stream at $t$ as soon as the water ceases to flow from the basin into the trap; but the rising of the water in D does not drive the air regurgitating through the water of the trap during flowage, as, the top of bulb D being higher than the junction of F with said bulb at the point $x$, a chamber for the retention of the air is formed in the top of said bulb D, whence it continues to react till it recovers its full expansion, which occurs at the moment D is emptied, when the valve settles on its seat $o'$ and prevents any suction which may then occur from acting on the water in the trap. The air in D prevents siphoning during flowage, and the valve prevents it at all other times, thus keeping the trap constantly full of water, and the water insures the complete operation of valve $n$ at the top of bulb B to prevent the escape of gas into the room.

The valve $o$ may be dispensed with, in which case pipe G should be a trifle larger than E and F, as shown in Fig. 4, in which case the air in D could not be exhausted to a degree sufficient to exert suction on the water in the trap, except under extremely unusual circumstances, if ever.

What I claim as new in my invention, and desire to secure by Letters Patent, is—

1. In a basin or sink trap, the supplemental reservoir C in the second arm, in combination with the ball-valve bulb B in the first arm of the trap, by which a double action is secured to valve $n$, substantially as described.

2. In a basin or sink trap, the bulb D, with valve $o$ in the waste-pipe below the trap, in combination with ball-valve bulb B, substantially as described.

3. In a basin or sink trap, the air chamber or bulb D, in combination with ball-valve bulb B, substantially as described.

4. In a basin or sink trap, the air-chamber D, in combination with reservoir C and ball-valve bulb B, substantially as described.

5. In a basin or sink trap, the bulb D, with valve $o$, in combination with reservoir C, and bulb B, with its valve $n$, substantially as described.

In testimony whereof I affix my signature in presence of two witnesses.

CHARLES H. DENISON.

Witnesses:
  WM. M. BAKER,
  CHAS. H. BARRETT.